(12) United States Patent
Nakazato et al.

(10) Patent No.: US 12,143,438 B2
(45) Date of Patent: Nov. 12, 2024

(54) RESOURCE SHARING SYSTEM

(71) Applicant: RAKUTEN MOBILE, INC., Tokyo (JP)

(72) Inventors: Jin Nakazato, Tokyo (JP); Saki Tanaka, Tokyo (JP); Haruka Horiuchi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/040,358

(22) PCT Filed: Feb. 14, 2022

(86) PCT No.: PCT/JP2022/005707
§ 371 (c)(1),
(2) Date: Feb. 2, 2023

(87) PCT Pub. No.: WO2023/152980
PCT Pub. Date: Aug. 17, 2023

(65) Prior Publication Data
US 2024/0259463 A1 Aug. 1, 2024

(51) Int. Cl.
G06F 15/173 (2006.01)
G06F 8/60 (2018.01)
H04L 43/0876 (2022.01)
H04L 67/10 (2022.01)

(52) U.S. Cl.
CPC ............. *H04L 67/10* (2013.01); *G06F 8/60* (2013.01); *H04L 43/0876* (2013.01)

(58) Field of Classification Search
CPC ........ H04L 67/10; H04L 43/0876; G06F 8/60
See application file for complete search history.

(56) References Cited

U.S. PATENT DOCUMENTS

| 10,372,490 B2* | 8/2019 | Ferris ................... G06F 9/50 |
| 2018/0219794 A1* | 8/2018 | Patil .................. H04L 47/745 |
| 2020/0145480 A1* | 5/2020 | Sohail ............... H04L 67/1095 |
| 2020/0285610 A1* | 9/2020 | Wang .................. G06F 3/065 |
| 2021/0011823 A1* | 1/2021 | Guim Bernat ....... G06F 11/263 |
| 2022/0261269 A1* | 8/2022 | Deaton ................ H04L 67/10 |
| 2022/0283792 A1* | 9/2022 | Kumar ............... H04L 41/0895 |

(Continued)

FOREIGN PATENT DOCUMENTS

JP 2017-143365 A 8/2017

*Primary Examiner* — John B Walsh
(74) *Attorney, Agent, or Firm* — Sughrue Mion, PLLC

(57) ABSTRACT

The present disclosure relates to resource sharing between clouds. According to the present disclosure, a control apparatus comprises: a resource monitor, a resource decider, a secondary cloud determiner, and a deployer. The resource monitor monitors a resource usage state of a cloud in a cloud group. The resource decider, with a creation request for a new application to a primary cloud in the cloud group serving as a trigger, decides whether or not a resource for deploying all components for constructing the new application is in the primary cloud. Based on the size of available resources if a surplus component that cannot be deployed in the primary cloud is deployed in a cloud other than the primary cloud in the cloud group, the secondary cloud determiner determines a secondary cloud in which the surplus component is to be deployed. The deployer deploys the surplus component in the secondary cloud.

19 Claims, 6 Drawing Sheets

(56) References Cited

U.S. PATENT DOCUMENTS

| | | | |
|---|---|---|---|
| 2023/0117081 A1* | 4/2023 | Hunter | G06F 8/60 709/226 |
| 2023/0179650 A1* | 6/2023 | Garg | G06N 3/02 709/224 |

* cited by examiner

RESOURCE SHARING SYSTEM

CROSS REFERENCE TO RELATED APPLICATIONS

This application is a National Stage of International Application No. PCT/JP2022/005707 filed Feb. 14, 2022.

TECHNICAL FIELD

The present disclosure relates to a resource sharing system.

With increasing demands for Internet of Things (IoT), Virtual Reality (VR), Augmented Reality (AR), and video streaming applications, etc., edge computing, which is a distributed architecture, has been gathering attention in recent years (see Patent Document 1). Edge computing is distributed computing in which at least some processing is performed by an edge cloud that is constructed in an edge server installed close to a user terminal (UE) instead of by a center cloud that is constructed in a central data center. By using an edge cloud, processing for providing services to user terminals, which was concentrated on the center cloud, is distributed to the edge cloud and processing load distribution is achieved.

CITATION LIST

Patent Literature

Patent Document 1: JP 2017-143365 A

SUMMARY OF INVENTION

Technical Problem

However, due to restrictions on, e.g., the location where the edge server is installed, the computing resources allocated to the edge cloud may be insufficient, and it may be difficult to provide stable services to user terminals.

Solution to Problem

One embodiment of the present disclosure is a control apparatus comprising one or more processors.

The control apparatus performs, with at least one of the one or more processors: monitoring a resource usage state of a cloud in a cloud group; with a creation request for a new application to a primary cloud in the cloud group serving as a trigger, deciding whether or not a resource for deploying all Containerized Network Functions (CNFs) for constructing the new application is in the primary cloud; based on a size of available resources if a surplus CNF that cannot be deployed in the primary cloud is deployed in a cloud other than the primary cloud in the cloud group, determining a secondary cloud in which the surplus CNF is to be deployed; and deploying the surplus CNF in the secondary cloud.

One embodiment of the present disclosure is a control method that is performed by one or more processors. The control method includes: monitoring a resource usage state of a cloud in a cloud group; with a creation request for a new application to a primary cloud in the cloud group serving as a trigger, deciding whether or not a resource for deploying all CNFs for constructing the new application is in the primary cloud; based on a size of available resources if a surplus CNF that cannot be deployed in the primary cloud is deployed in a cloud other than the primary cloud in the cloud group, determining a secondary cloud in which the surplus CNF is to be deployed; and deploying the surplus CNF in the secondary cloud.

DESCRIPTION OF EMBODIMENTS

Hereinafter, one embodiment of the present disclosure will be explained in detail with reference to the drawings.

One Embodiment

Figure 1:
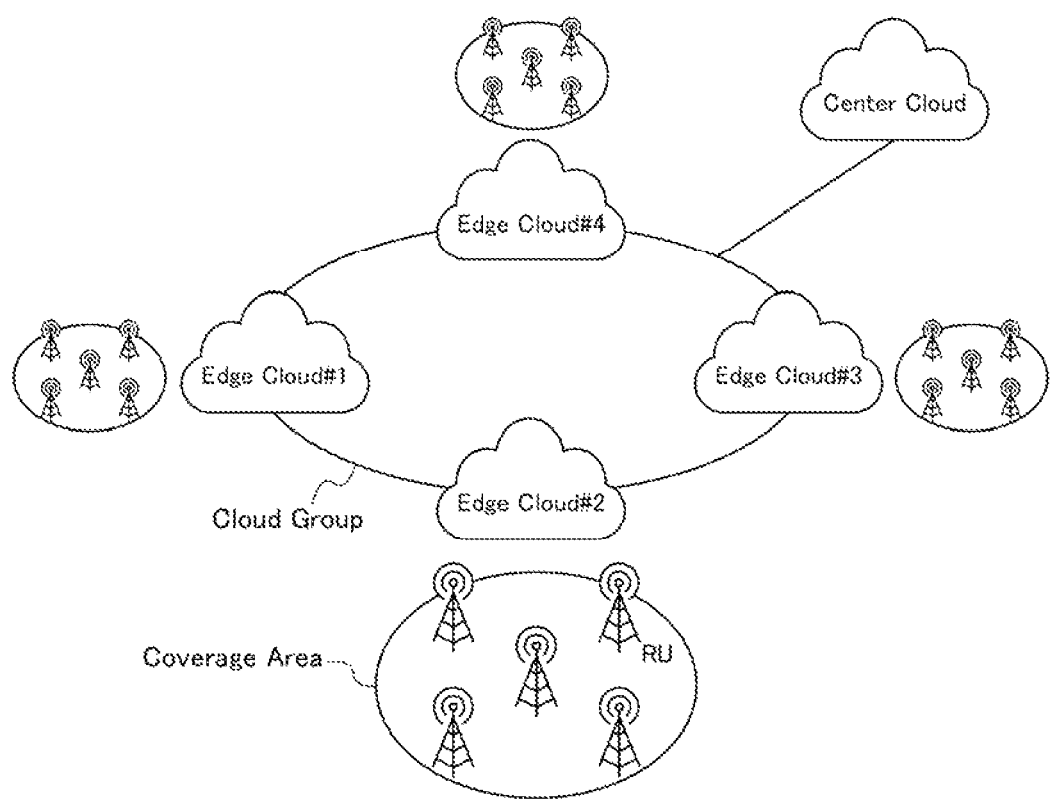
FIG. 1 is a conceptual scheme that illustrates a cloud group to which the control apparatus according to the present embodiment is applied.

FIG. 1 is a conceptual scheme that illustrates a cloud group to which a control apparatus 100 according to the present embodiment is applied. The cloud group includes a plurality (L, L being an integer) of edge clouds.

FIG. 1 illustrates an example in which the cloud group includes four (L=4) edge clouds.

Applications for providing various services to user terminals (not shown) in a coverage area formed from at least one Radio Unit (RU) can be deployed in each edge cloud.

A cloud group is formed from a plurality of edge clouds. For example, a cloud group is formed from edge clouds that are constructed in edge servers installed in geographically close locations. A cloud group does not necessarily need to be formed from edge clouds installed in geographically close locations alone. For example, a cloud group may be formed from edge clouds that are constructed in edge servers installed in logically close locations.

Moreover, a cloud group may include a center cloud that is constructed in a central data center.

Moreover, a cloud group may include a cloud that is constructed in a regional data center.

Hereinafter, edge cloud, center cloud, and the like that are included in a cloud group will simply be referred to as "clouds."

Before describing the control apparatus 100 according to the present embodiment, the relationship between a service provided to a user terminal and applications deployed in a cloud will be described using FIG. 2.

In the present embodiment, a service provided to a user terminal is constructed from a microservice architecture.

Figure 2:
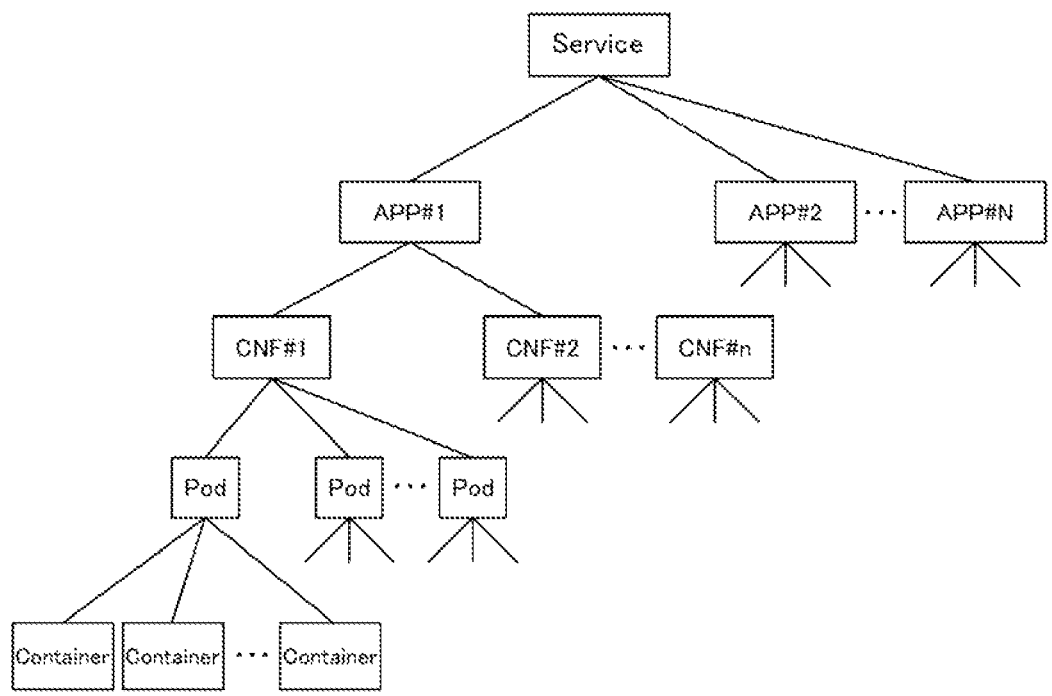
FIG. 2 illustrates the relationship between a service and applications in a microservice architecture.

FIG. 2 illustrates the relationship between a service and applications (hereinafter referred to as APPs) in a microservice architecture.

As shown in FIG. 2, a service is constructed from at least one APP. The number of APPs for constructing a service differs depending on the service.

Each APP is constructed from at least one Containerized Network Function (CNF).

CNFs operate on, e.g., "Kubernetes" ®. Kubernetes is an open source OSS (Open Source Software) that automatically performs setting and management of containerized services.

The number of CNFs for constructing one APP can differ depending on the APP and the design.

A CNF operating on Kubernetes is constructed from at least one Pod. A Pod is the smallest unit of application that can be executed by Kubernetes. A plurality of Pods are run and managed by Kubernetes. Moreover, Pods operating in CNFs have a self-healing function. For example, when a certain Pod has stopped operating, another Pod is started, and CNF functions are self-healed.

Each Pod is constructed from at least one container.

The use of microservice architectures is also being investigated in 5th Generation Mobile Communication System (5G).

Examples of the above services in 5G include Radio Access Networks (RANs) and Core Networks (CNs).

When the service is a RAN, the APPs are a Central Unit (CU) and a Distributed Unit (DU).

Moreover, when the service is a Core Network (CN), the APP is a Service Network Function (SNF) that constructs CNs such as Access and Mobility Management Function (AMF) and User Plane Function (UPF).

When APP #1 is a CU, CNF #1 is CU-CP (Control Plane) and CNF #2 is CU-UP (User Plane).

CU-CP includes Radio Resource Control (RRC). CU-UP includes a Service Data Adaption Protocol (SDAP) and a Packet Data Convergence Protocol (PDCP) pertaining to the user plane.

CU-CP and CU-UP are capable of functional cooperative communication by an E1 interface. Both CU-CP and CU-UP can connect to a DU by an F1 interface.

Figure 3:
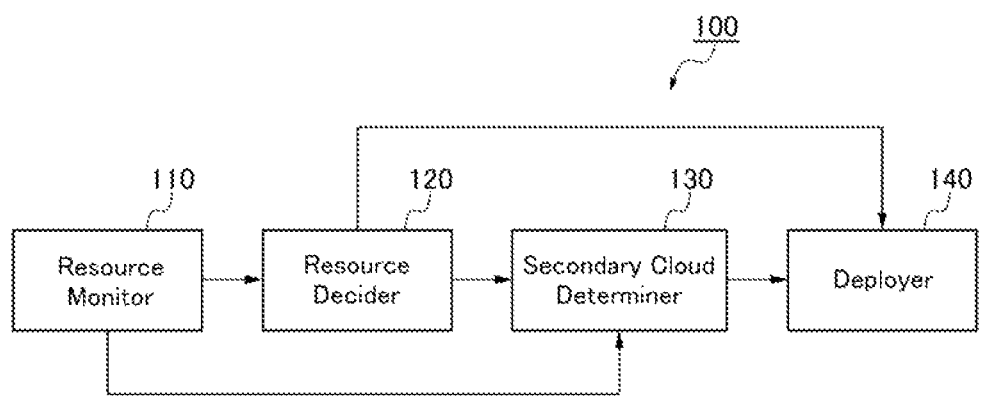
FIG. 3 is a functional block diagram that illustrates a configuration of the control apparatus according to the present embodiment.

FIG. 3 is a functional block diagram that illustrates a configuration of the control apparatus 100 according to the present embodiment.

The control apparatus 100 comprises a resource monitor 110, a resource decider 120, a secondary cloud determiner 130, and a deployer 140.

The resource monitor 110 monitors a resource usage state of a cloud in a cloud group. The monitoring may be performed periodically and may be performed upon any one of the clouds being notified of a creation request for a new APP, as described below.

APPs already placed in the clouds and new APPs are constructed from a microservice architecture. That is, these APPs are constructed from at least one CNF.

A resource usage state includes information on, e.g., the total number of CNFs that can be placed in a cloud and the total number of CNFs for all APPs that are actually placed in a cloud. The total number of CNFs that can be placed in a cloud can be determined by the computing resources of the cloud. The total number of CNFs for all APPs that are actually placed in the cloud is the total number of CNFs already placed in the cloud.

The resource decider 120, with a creation request for a new APP to a cloud in the cloud group serving as a trigger, decides whether or not a resource for deploying all of the CNFs for constructing the new APP is in the cloud. Hereinafter, the cloud that received the creation request for a new APP will be referred to as a "primary cloud."

For example, the resource decider 120 receives the above trigger directly from the primary cloud. The resource decider 120 may receive the above trigger from management apparatus, etc. that manages the registration of new APPs.

The creation request includes information (hereinafter also referred to as "application information") on the new APP. The application information includes information on the total number of CNFs for constructing the new APP. The application information may further include information regarding CNF characteristics.

The CNF characteristics are, e.g., information indicating the roles of CNFs during service provision, such as CNFs having a user data-related function or a control data-related function.

Using the following information (1) and (2), the resource decider 120 can decide whether or not the resource for deploying all of the CNFs for constructing the new APP is in the primary cloud.

(1) Maximum number of CNFs that can be placed in primary cloud: $f_{max}$ (2) Total number of CNFs requested to be placed in primary cloud: $f_{sum}$ $f_{max}$ and $f_{sum}$ are counted in units of CNFs. In other words, $f_{max}$ and $f_{sum}$ represent a corresponding number of CNFs.

$f_{max}$ is the maximum number of CNFs that can be placed in the primary cloud. In other words, $f_{max}$ is the sum of the number of CNFs already placed in the primary cloud and the number of CNFs that can be further placed in the primary cloud. The maximum number of CNFs that can be placed in the primary cloud can be determined by the computing resources of the primary cloud.

Moreover, $f_{sum}$ is the sum obtained by adding the number of CNFs for constructing the new APP, which has been requested to be placed in the primary cloud, to the number of CNFs already placed in the primary cloud. That is, the total number of CNFs $f_{sum}$ is the total number of CNFs scheduled to be placed in the primary cloud when it is deemed that all of the CNFs for constructing the new APP are to be placed in the primary cloud.

For example, based on a resource usage proportion R defined by the ratio $f_{sum}/f_{max}$, the resource decider 120 decides whether or not the resource for deploying all of the CNFs for constructing the new APP is in the primary cloud.

If the resource usage proportion R is 1 or less, i.e., in the following situation,

[Math. 1]

$$R = \frac{f_{sum}}{f_{max}} \leq 1 \qquad (1)$$

it is decided that the resource for deploying all of the CNFs for constructing the new APP is in the primary cloud.

In this case, the resource decider 120 instructs the deployer 140 to deploy all of the CNFs for constructing the new APP in the primary cloud.

Meanwhile, if the resource usage proportion R is greater than 1, i.e., in the following situation,

[Math. 2]

$$R = \frac{f_{sum}}{f_{max}} > 1 \qquad (2)$$

the resource decider 120 decides that the resource for deploying all of the CNFs for constructing the new APP is not in the primary cloud.

In the case of the resource usage proportion R>1, the resource decider 120 calculates the number of surplus CNFs ($f_d$) that cannot be deployed in the primary cloud among all of the CNFs for constructing the new APP.

The resource decider 120 calculates the number of surplus CNFs ($f_d$) by, e.g., the following formula.

[Math. 3]

$$f_d = f_{sum} - f_{max} \quad (3)$$

If it is deemed that among the CNFs for constructing the new APP, as many CNFs as possible should be placed in the primary cloud, the number of surplus CNFs ($f_d$) calculated using formula (3) will be the number of CNFs that cannot be deployed in the primary cloud.

The method for calculating the number of surplus CNFs ($f_d$) is not limited to the above. For example, it is possible to preliminarily set a number of CNFs regarded as placeable in the primary cloud as a threshold ($f_{threshold}$, wherein $f_{threshold} < f_{max}$) and use the number ($f_{sum} - f_{threshold}$) exceeding this threshold ($f_{threshold}$) as the number of surplus CNFs ($f_d$).

[Math. 4]

$$f_d = f_{sum} - f_{threshold}, f_{threshold} < f_{max} \quad (4)$$

In this case, ($f_{max} - f_{threshold}$) available resources, in units of CNFs, are secured in the primary cloud. Due thereto, when the primary cloud receives an urgent creation request for a new APP, it is likely that the primary cloud will be able to handle the urgent request immediately.

The resource decider 120 notifies the secondary cloud determiner 120 of the number of surplus CNFs ($f_d$).

The secondary cloud determiner 130 determines a secondary cloud in which the surplus CNFs are to be deployed. The surplus CNFs are the $f_d$ CNFs regarded as not deployable in the primary cloud among all of the CNFs for constructing the new APP.

The secondary cloud determiner 130 calculates a size of available resources if a surplus CNF is deployed in a cloud other than the primary cloud in the cloud group. The size of available resources is counted in units of CNFs.

Moreover, based on the size of available resources, the secondary cloud determiner 130 determines a secondary cloud in which the surplus CNF is to be deployed. The method for determining a secondary cloud will be described in detail below.

The deployer 140 deploys $f_d$ surplus CNFs in the determined secondary cloud. Further, the deployer 140 deploys other CNFs in the primary cloud. Due thereto, for example, together with the already placed CNFs, $f_{max}$ CNFs are placed in the primary cloud. In this manner, the new APP is distributed and deployed in a primary cloud and a secondary cloud.

The deployer 140 may select the CNFs to be deployed in the secondary cloud according to the CNF characteristics described above. For example, if the new APP is CU, it is possible to determine deployment of CU-UP pertaining to control data in the secondary cloud.

Further, the surplus CNF does not need to be a CNF for constructing the new APP and may, for example, be a CNF for constructing an existing APP that has already been placed in the primary cloud. In that case, all of the CNFs for the new APP are deployed in the primary cloud and some of the CNFs for existing APPs are deployed in the secondary cloud.

Figure 4:
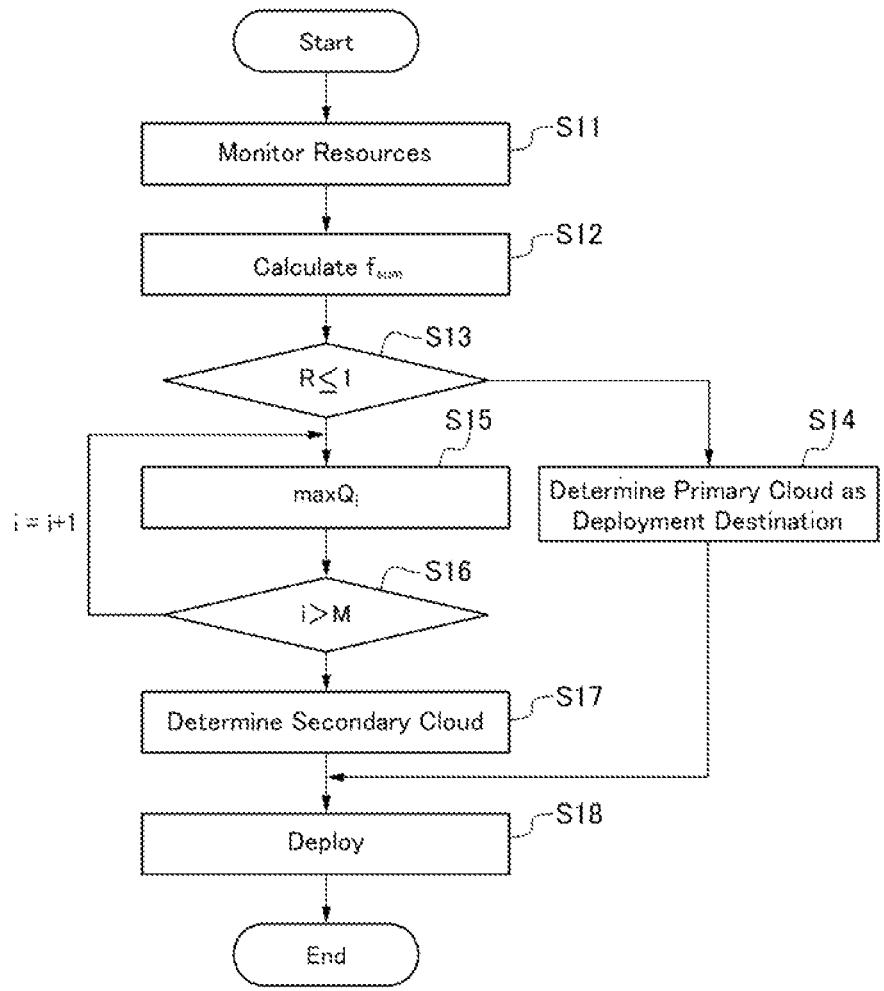
FIG. 4 is a flow chart that describes actions of the control apparatus according to the present embodiment.

Next, operations in the control apparatus 100 will be explained using the flow chart of FIG. 4.

The resource monitor 110 monitors a resource usage state of a cloud in a cloud group (S11).

The resource decider 120 calculates a total number of CNFs ($f_{sum}$) scheduled to be placed in the primary cloud as follows (S12).

[Math. 5]

$$f_{sum} = \sum_{u=1}^{U} \sum_{n=1}^{N_u} f_{u,n} \quad (5)$$

wherein u: index for identifying an APP,

U: total number of APPs, n: index for identifying a CNF for constructing an APP, $N_u$: total number of CNFs for constructing APP$_u$.

$f_{u,n}$ is a "cardinal number" such as one, two, etc.

The APP includes the new APP for which a creation request has been made to the primary cloud in addition to existing APPs placed in the primary cloud.

That is, the total number of CNFs $f_{sum}$ includes the total number of CNFs for constructing the new APP in addition to the total number of CNFs for constructing the existing APPs placed in the primary cloud.

The resource decider 120 compares the above-mentioned resource usage proportion R with 1 (S13).

Where R≤1, the resource decider 120 decides that the CNFs for constructing all APPs including the new APP are deployed within the primary cloud (S14).

Meanwhile, where R>1, the resource decider 120 decides that the resource for deploying all of the CNFs for constructing the new APP is not in the primary cloud. Moreover, the resource decider 120 notifies the secondary cloud determiner 130 of information regarding the number of surplus CNFs ($f_d$) that cannot be deployed in the primary cloud among all of the CNFs for constructing the new APP. The number of surplus CNFs ($f_d$) is calculated by, e.g., the above-mentioned formula (3).

In order to determine a secondary cloud, the secondary cloud determiner 130 uses the following evaluation function $Q_i$.

[Math. 6]

$$Q_i = f_{max}^i - (f_{sum}^i + f_d), i = 1, 2, \ldots, M \quad (6)$$

wherein i: index for identifying a cloud other than the primary cloud in the cloud group, M: total number of clouds other than primary cloud in the cloud group (M=N−1), N: total number of clouds in the cloud group.

$f_{max}^i$ is the maximum number of CNFs that can be placed in a cloud (i). In other words, $f_{max}^i$ is the sum of the number of CNFs already placed in the cloud (i) and the number of CNFs that can be further placed in the cloud (i).

Moreover, $f_{sum}^i$ is the sum obtained by adding the number of CNFs for constructing a new APP, which has been requested to be placed in the cloud (i), to the number of CNFs already placed in the cloud (i). That is, the total number of CNFs $f_{sum}^i$ is the total number of CNFs scheduled to be placed in the cloud (i).

In other words, the evaluation function $Q_i$ represents the size of available resources if $f_d$ surplus CNFs are deployed in the cloud (i). As mentioned above, the size of available resources is counted in units of CNFs.

The secondary cloud determiner 130 calculates the evaluation function $Q_i$ for all of the clouds other than the primary cloud in the cloud group (S15, S16).

The secondary cloud determiner 130 determines, as the secondary cloud in which the surplus $f_d$ CNFs are to be deployed, the cloud (i) with the greatest evaluation function $Q_i$ among the evaluation functions $Q_i$ of all of the clouds other than the primary cloud (S17). That is, the cloud (i) with the greatest available resource is determined as the secondary cloud.

Due thereto, if surplus $f_d$ CNFs are accepted, the surplus $f_d$ CNFs will be deployed in the cloud with the maximum size of available resources. In this manner, it is possible to suppress the maximum value of the resource usage proportion R in the cloud group.

The deployer 140 deploys all or some of the CNFs for the new APP in the deployment destination determined in S14 or S17.

In S17, the secondary cloud determiner 130 may further determine the secondary cloud based on the distances between the primary cloud and the clouds other than the primary cloud.

For example, if there are a plurality of clouds with available resources of the same size, the secondary cloud determiner 130 may determine, as the secondary cloud, the cloud with the shortest distance from the primary cloud among the plurality of clouds with available resources of the same size.

Moreover, in S17, the secondary cloud determiner 130 may determine, as the secondary cloud, the cloud with the shortest distance from the primary cloud. In these cases, the CNFs for constructing one APP will be distributed and deployed in clouds with the shortest distance therebetween, so communication delays caused by CNF placement can be minimized.

Figure 5:
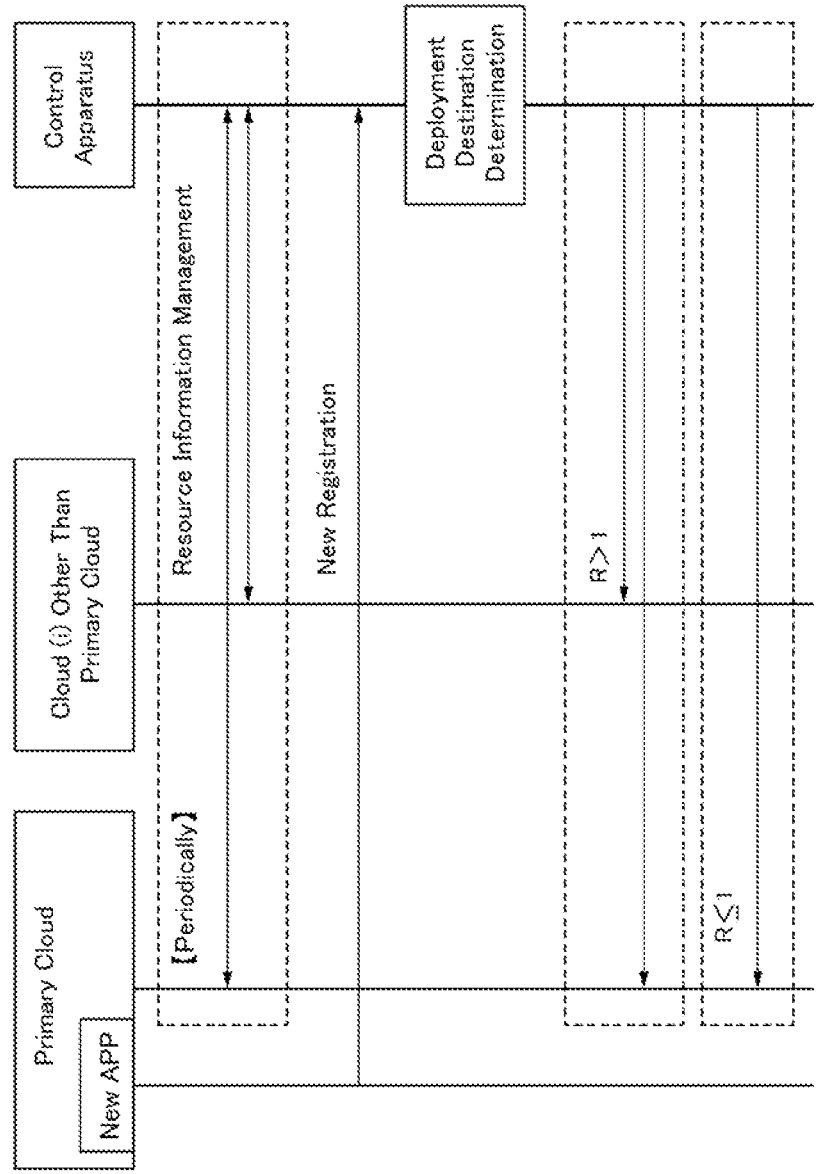
FIG. 5 illustrates one example of a processing sequence in the control apparatus according to the present embodiment.

Next, operations in the control apparatus 100 according to the present embodiment will be explained using FIG. 5. FIG. 5 illustrates one example of a processing sequence in the control apparatus 100 according to the present embodiment.

The control apparatus 100 periodically monitors the resource usage states of clouds in the cloud group.

FIG. 5 illustrates a manner in which the resource usage state of the cloud (i) other than the primary cloud in the cloud group is monitored. The monitoring of resource usage state may be performed on the cloud (i) (wherein i=1 to N−1; N=total number of clouds in the cloud group).

With a creation request for a new APP to the primary cloud in the cloud group serving as a trigger, the control apparatus 100 decides whether or not a resource for deploying all of the CNFs for constructing the new APP is in the primary cloud. For example, if the resource usage proportion R, defined by the ratio $f_{sum}/f_{max}$, is 1 or less, the control apparatus 100 decides that the resource for deploying all of the CNFs for constructing the new APP is in the primary cloud. Meanwhile, if the resource usage proportion R is greater than 1, it is decided that the resource for deploying all of the CNFs for constructing the new APP is not in the primary cloud.

If the resource for deploying all of the CNFs for constructing the new APP is in the primary cloud, the control apparatus 100 determines that all of the CNFs for constructing the new APP are to be deployed in the primary cloud (deployment destination determination). Moreover, the control apparatus 100 deploys all of the CNFs for constructing the new APP in the primary cloud.

Meanwhile, if the resource for deploying all of the CNFs for constructing the new APP is not in the primary cloud, the control apparatus 100 determines a cloud (secondary cloud) in which a surplus CNF is to be placed according to the size of available resources (deployment destination determination).

Once the deployment destination is determined, the control apparatus 100 deploys the surplus CNF in the secondary cloud and the other CNFs in the primary cloud.

Application Example

An application example for the control apparatus 100 according to the present embodiment will be explained using FIG. 6A and FIG. 6B.

Below, a case in which a creation request for a virtualized CU (vCU), as a new APP, has been made to an Edge Cloud #1 will be explained as an example. As mentioned above, CU can be constructed from CU-CP and CU-UP that correspond to CNFs.

New APPs are not limited to CU. For example, an APP may be an NF (Network Function) in a mobile communication system such as 5G. Examples of NFs in a mobile communication system include SFN and DU in CN in addition to CU.

Further, the control apparatus 100 according to the present disclosure can be applied to APPs constructed from a plurality of CNFs capable of functional cooperative communication with one another.

Figure 6A:
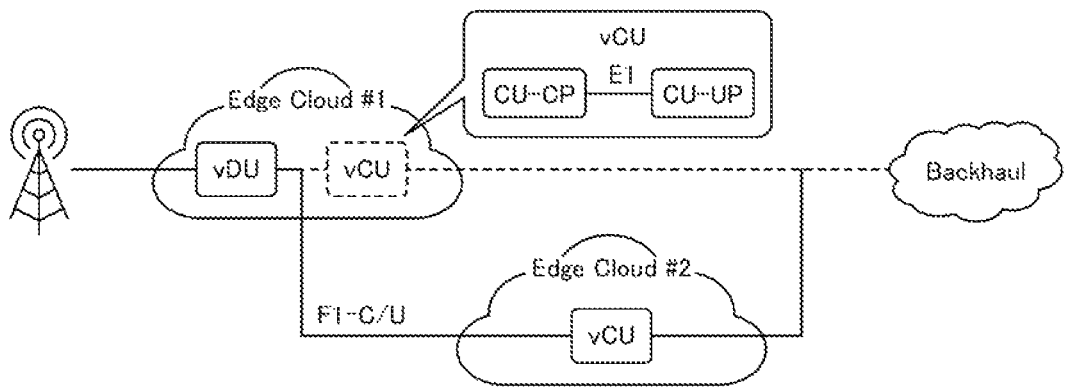
FIG. 6A is for describing an example of application of the control apparatus according to the present embodiment.

FIG. 6A provides an example of a case in which vCU was created in an Edge Cloud #2 because Edge Cloud #1 did not have the resource to enable creation of the vCU at the time the creation request for the vCU was made.

Figure 6B:
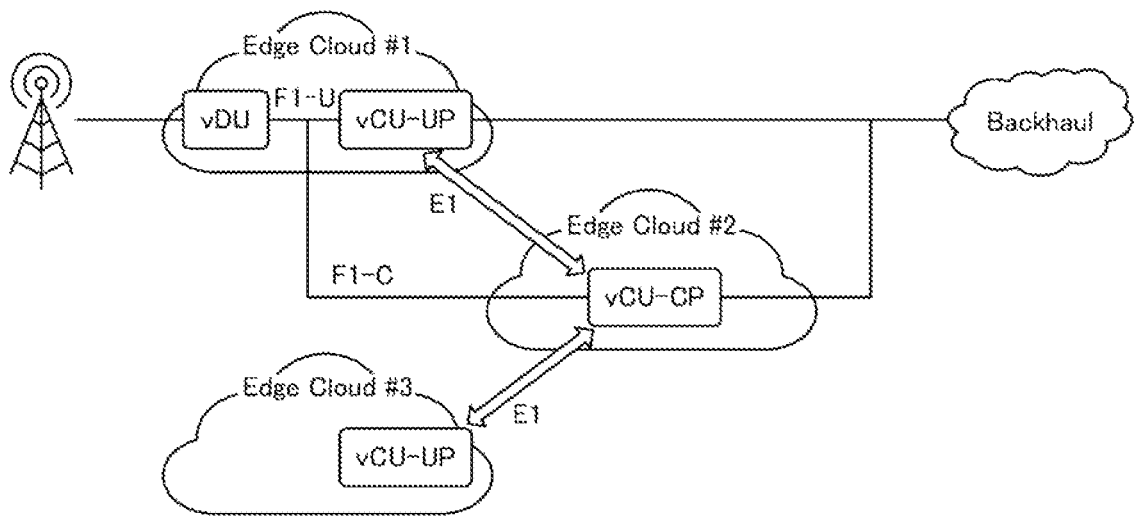
FIG. 6B is for describing an example of application of the control apparatus according to the present embodiment.

In contrast, FIG. 6B is a placement example of a case in which a cloud group was formed and the control apparatus 100 according to the present embodiment was used to share resources between clouds. When a creation request for the vCU is made to Edge Cloud #1, even if Edge Cloud #1 does not have enough resource to enable creation of the vCU, by using the control apparatus 100 according to the present embodiment, some of the CNFs for constructing the vCU can be deployed in Edge Cloud #2. FIG. 6B illustrates a manner in which the control apparatus 100 according to the present embodiment is used to deploy CU-UP in Edge Cloud #1 and CU-CP in Edge Cloud #2. CU-UP and CU-CP are CNFs for constructing the vCU.

In this manner, even if there are not enough computing resources in the cloud that had a creation request for a new APP, resources are shared between clouds forming the cloud group. Due thereto, the CNFs for constructing a new APP can be distributed and placed in clouds in the cloud group. As such, even if there are not enough computing resources that enable placement in a cloud, the cloud group, as a whole, allows stable provision of services.

As shown in FIG. 6B, the CU-CP deployed to Edge Cloud #2 can connect to the CU-UP deployed in an Edge Cloud #3 by an E1 interface. Due thereto, the CU-CP deployed in Edge Cloud #2 can be shared by the CU-UP deployed in Edge Cloud #1 and the CU-UP deployed in Edge Cloud #3. In this case, there is no need to place a CU-CP in Edge Cloud #3, and it is possible to suppress computing resource consumption.

As explained above, the control apparatus 100 according to the present embodiment comprises a resource monitor 110, a resource decider 120, a secondary cloud determiner 130, and a deployer 140.

The resource monitor 110 monitors a resource usage state of a cloud in a cloud group.

The resource decider 120 decides, with a creation request for a new application to the primary cloud in the cloud group serving as a trigger, whether or not a resource for deploying all CNFs (Containerized Network Functions) for constructing the new application is in the primary cloud.

The secondary cloud determiner 130 determines a secondary cloud in which a surplus CNF is to be deployed based on the size of available resources if the surplus CNF that cannot be deployed in the primary cloud is deployed in a cloud other than the primary cloud in the cloud group.

The deployer 140 deploys the surplus CNF in the secondary cloud.

Due thereto, resources are shared between the clouds in the cloud group, and even if the cloud to which a creation request for a new APP has been made does not have enough resource to deploy all CNFs for constructing the APP, stable provision of services is possible.

Moreover, since the CNFs for constructing the APP can be distributed and placed in different clouds, a flexible placement can be adopted to enable suppression of computing resource consumption of the cloud group as a whole.

In the above explanation, a case in which a service provided to a user terminal and APPs deployed in clouds have the relationship shown in FIG. 2 was described as an example but is not limited thereto. An APP is constructed from role units divided for the respective roles during the provision of a service, and even when these role units are deployed in different clouds, it is only necessary to adopt an architecture that enables functional cooperative communication between the role units.

Figure 7:
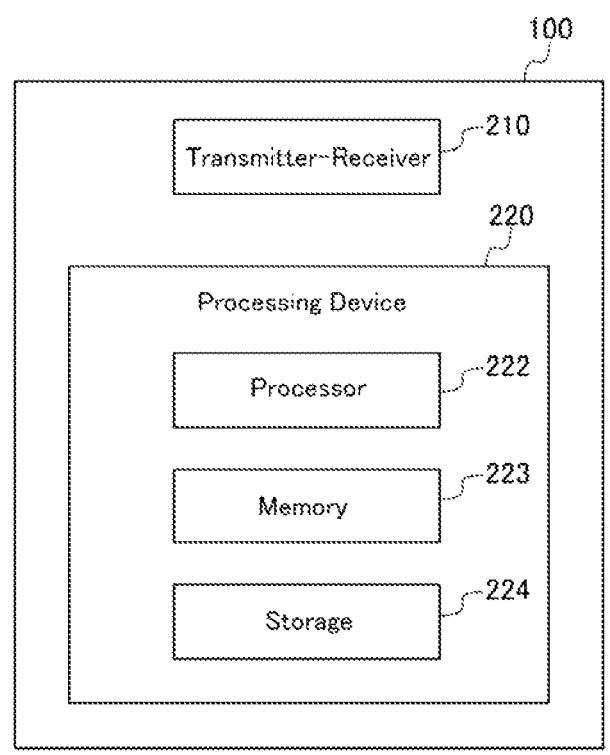
FIG. 7 is a block diagram that illustrates a configuration of the control apparatus shown in FIG. 3.

FIG. 7 is a block diagram that illustrates a configuration of the control apparatus 100 according to the present embodiment.

The control apparatus 100 includes a transmitter-receiver 210 and a processing device 220.

The transmitter-receiver 210 transmits and receives data with the clouds shown in FIG. 2.

The processing device 220 includes a processor 222 and a memory 223.

There are one or more of the processor 222 and the memory 223.

The processing device 220 may further includes a storage 224.

The processing device 220 can operate the transmitter-receiver 210 as well as perform data processing for the control apparatus 100 shown in FIG. 3 by the processor 222 and the memory 223.

Further, the storage 224 can store application information.

Examples of application information to be stored in the storage 224 can include information on the total number of CNFs for constructing the new APP and information regarding CNF characteristics.

The control apparatus 100 may further include other components that are not shown.

The control apparatus 100 according to the present embodiment comprises one or more processors. The control apparatus performs, with at least one of the one or more processors: monitoring a resource usage state of a cloud in a cloud group; with a creation request for a new application to a primary cloud in the cloud group serving as a trigger, deciding whether or not a resource for deploying all CNFs for constructing the new application is in the primary cloud; based on a size of available resources if a surplus CNF that cannot be deployed in the primary cloud is deployed in a cloud other than the primary cloud in the cloud group, determining a secondary cloud in which the surplus CNF is to be deployed; and deploying the surplus CNF in the secondary cloud.

The present disclosure is not limited to the above configuration. The present disclosure also includes a control program. That is, the present disclosure also includes a control program for making one or more processors operate each part of the control apparatus 100.

The above program may be provided by being recorded on a computer-readable non-transitory storage medium.

The present disclosure includes the following embodiments.

[1] A control apparatus that comprises one or more processors and, with at least one of the one or more processors, performs:
  monitoring a resource usage state of a cloud in a cloud group;
  with a creation request for a new application to a primary cloud in the cloud group serving as a trigger, deciding whether or not a resource for deploying all CNFs (Containerized Network Functions) for constructing the new application is in the primary cloud;
  based on a size of available resources if a surplus CNF that cannot be deployed in the primary cloud is deployed in a cloud other than the primary cloud in the cloud group, determining a secondary cloud in which the surplus CNF is to be deployed; and
  deploying the surplus CNF in the secondary cloud.

[2] The control apparatus described in [1], wherein the secondary cloud is the cloud with the greatest size of available resources.

[3] The control apparatus described in [1] or [2], which further determines the secondary cloud based on a distance between the primary cloud and a cloud other than the primary cloud.

[4] The control apparatus described in [3], wherein when there is a plurality of clouds with the same size of available resources, the secondary cloud is the cloud with the shortest distance from the primary cloud among the plurality of clouds with the same size of available resources.

[5] The control apparatus described in [3], wherein the secondary cloud is the cloud with the shortest distance from the primary cloud.

[6] The control apparatus described in any one of [1] to [5], wherein the size of available resources of a cloud (i) in the cloud group is calculated using an evaluation function $Q_i$.

[Math. 7]

$$Q_i = f^i_{max} - (f^i_{sum} + f_d), i = 1, 2, \ldots, M \qquad (7)$$

wherein
  i: index for identifying a cloud other than the primary cloud in the cloud group, M: total number of clouds other than the primary cloud in the cloud group (M=N−1), N: total number of clouds in the cloud group, $f_{max}^i$ is a maximum number of CNFs that can be placed in the cloud (i), $f_{sum}^i$ is a sum obtained by adding a number of CNFs for constructing the new application, which have been requested to be placed in the cloud (i), to a number of CNFs already placed in the cloud (i), and $f_d$ is a number of surplus CNFs that cannot be deployed in the primary cloud among all CNFs for constructing the new application.

[7] The control apparatus described in [6], wherein the number of surplus CNFs $f_d$ is calculated using:

[Math. 8]

$$f_d = f_{sum} - f_{max} \qquad (8)$$

wherein $f_{sum}$ is a total number of CNFs scheduled to be placed in the primary cloud, and $f_{max}$ is a maximum number of CNFs that can be placed in the primary cloud.

[8] The control apparatus described in [6], wherein the number of surplus CNFs $f_d$ is calculated using:

[Math. 9]

$$f_d = f_{sum} - f_{threshold}, f_{threshold} < f_{max} \qquad (9)$$

wherein $f_{sum}$ is a total number of CNFs scheduled to be placed in the primary cloud, $f_{threshold}$ is a preliminarily set threshold of a number of CNFs that can be placed in the primary cloud, and $f_{max}$ is a maximum number of CNFs that can be placed in the primary cloud.

[9] The control apparatus described in any one of [1] to [8], wherein the cloud group is formed from edge clouds that are constructed in edge servers installed in geographically close locations.

[10] The control apparatus described in any one of [1] to [9], wherein the cloud group is formed from edge clouds that are constructed in edge servers installed in logically close locations.

[11] The control apparatus described in any one of [1] to [10], wherein the cloud group includes a center cloud constructed in a central data center.

[12] The control apparatus described in any one of [1] to [11], wherein the cloud group includes a cloud constructed in a regional data center.

[13] The control apparatus described in any one of [1] to [12], wherein the new application is an NF (Network Function) in a mobile communication system.

[14] The control apparatus described in any one of [1] to [13], wherein the primary cloud is an edge cloud.

[15] The control apparatus described in any one of [1] to [14], wherein the secondary cloud is an edge cloud.

[16] The control apparatus described in any one of [1] to [14], wherein the secondary cloud is a center cloud.

[17] The control apparatus described in any one of [1] to [16], wherein the new application is constructed from a microservice architecture.

[18] A control method that is performed by one or more processors, the control method including:

monitoring a resource usage state of a cloud in a cloud group;

with a creation request for a new application to a primary cloud in the cloud group serving as a trigger, deciding whether or not a resource for deploying all CNFs for constructing the new application is in the primary cloud;

based on a size of available resources if a surplus CNF that cannot be deployed in the primary cloud is deployed in a cloud other than the primary cloud in the cloud group, determining a secondary cloud in which the surplus CNF is to be deployed; and deploying the surplus CNF in the secondary cloud.

The present disclosure is not limited to the embodiments described above and includes various modified examples in which constituent elements have been added, removed, or replaced with respect to the configurations indicated above.

REFERENCE SIGNS LIST

100 Control apparatus
110 Resource monitor
120 Resource decider
130 Secondary cloud determiner
140 Deployer
210 Transmitter-receiver
220 Processing device
222 Processor
223 Memory
224 Storage

The invention claimed is:

1. A control apparatus that comprises one or more processors and, with at least one of the one or more processors, performs:

monitoring a resource usage state of a cloud in a cloud group;

with a creation request for a new application to a primary cloud in the cloud group serving as a trigger, deciding whether or not a resource for deploying all CNFs (Containerized Network Functions) for constructing the new application is in the primary cloud;

based on a size of available resources of the primary cloud, for a surplus CNF that cannot be deployed in the primary cloud that is to be deployed in a cloud other than the primary cloud in the cloud group, determining a secondary cloud in which the surplus CNF is to be deployed; and deploying the surplus CNF in the secondary cloud wherein the available resources of the primary cloud are based on available containers within the primary cloud on which the CNFs are deployed.

2. The control apparatus according to claim 1, wherein the secondary cloud is the cloud with the greatest size of available resources.

3. The control apparatus according to claim 1, which further determines the secondary cloud based on a distance between the primary cloud and a cloud other than the primary cloud.

4. The control apparatus according to claim 3, wherein when there is a plurality of clouds with the same size of available resources, the secondary cloud is the cloud with the shortest distance from the primary cloud among the plurality of clouds with the same size of available resources.

5. The control apparatus according to claim 3, wherein the secondary cloud is the cloud with the shortest distance from the primary cloud.

6. The control apparatus according to claim 1, wherein the size of available resources of a cloud (i) in the cloud group is calculated using an evaluation function $Q_i$,

[Math. 10]
$$Q_i = f_{max}^i - (f_{sum}^i + f_d), i = 1, 2, \ldots, M \qquad (10)$$

wherein
i: index for identifying a cloud other than the primary cloud in the cloud group,
M: total number of clouds other than primary cloud in the cloud group (M=N−1),
N: total number of clouds in the cloud group,
$f_{max}^i$ is a maximum number of CNFs that can be placed in the cloud (i),
$f_{sum}^i$ is a sum obtained by adding a number of CNFs for constructing the new application, which have been requested to be placed in the cloud (i), to a number of CNFs already placed in the cloud (i), and
$f_d$ is a number of surplus CNFs that cannot be deployed in the primary cloud among all CNFs for constructing the new application.

7. The control apparatus according to claim 6, wherein the number of surplus CNFs $f_d$ is calculated using:

[Math. 11]
$$f_d = f_{sum} - f_{max} \qquad (11)$$

wherein
$f_{sum}$ is a total number of CNFs scheduled to be placed in the primary cloud, and
$f_{max}$ is a maximum number of CNFs that can be placed in the primary cloud.

8. The control apparatus according to claim 6, wherein the number of surplus CNFs $f_d$ is calculated using:

[Math. 12]
$$f_d = f_{sum} - f_{threshold}, f_{threshold} < f_{max} \qquad (12)$$

wherein
$f_{sum}$ is a total number of CNFs scheduled to be placed in the primary cloud,
$f_{threshold}$ is a preliminarily set threshold of a number of CNFs that can be placed in the primary cloud, and
$f_{max}$ is a maximum number of CNFs that can be placed in the primary cloud.

9. The control apparatus according to claim 1, wherein the cloud group is formed from edge clouds that are constructed in edge servers installed in geographically close locations.

10. The control apparatus according to claim 1, wherein the cloud group is formed from edge clouds that are constructed in edge servers installed in logically close locations.

11. The control apparatus according to claim 1, wherein the cloud group includes a center cloud constructed in a central data center.

12. The control apparatus according to claim 1, wherein the cloud group includes a cloud constructed in a regional data center.

13. The control apparatus according to claim 1, wherein the new application is an NF (Network Function) in a mobile communication system.

14. The control apparatus according to claim 1, wherein the primary cloud is an edge cloud.

15. The control apparatus according to claim 1, wherein the secondary cloud is an edge cloud.

16. The control apparatus according to claim 1, wherein the secondary cloud is a center cloud.

17. The control apparatus according to claim 1, wherein the new application is constructed from a microservice architecture.

18. A control method that is performed by one or more processors, the control method including:
monitoring a resource usage state of a cloud in a cloud group;
with a creation request for a new application to a primary cloud in the cloud group serving as a trigger, deciding whether or not a resource for deploying all CNFs for constructing the new application is in the primary cloud;
based on a size of available resources of the primary cloud, if for a surplus CNF that cannot be deployed in the primary cloud that is to be deployed in a cloud other than the primary cloud in the cloud group, determining a secondary cloud in which the surplus CNF is to be deployed; and
deploying the surplus CNF in the secondary cloud,
wherein the available resources of the primary cloud are based on available containers within the primary cloud on which the CNFs are deployed.

19. A non-transitory computer-readable medium with instructions stored thereon executed by one or more processors to perform the control method comprising:
monitoring a resource usage state of a cloud in a cloud group;
with a creation request for a new application to a primary cloud in the cloud group serving as a trigger, deciding whether or not a resource for deploying all CNFs for constructing the new application is in the primary cloud;
based on a size of available resources of the primary cloud, for a surplus CNF that cannot be deployed in the primary cloud that is to be deployed in a cloud other than the primary cloud in the cloud group, determining a secondary cloud in which the surplus CNF is to be deployed; and
deploying the surplus CNF in the secondary cloud,
wherein the available resources of the primary cloud are based on available containers within the primary cloud on which the CNFs are deployed.

* * * * *